(12) United States Patent
Popivanov (10) Patent No.: US 7,299,248 B2
(45) Date of Patent: Nov. 20, 2007

(54) METHOD, SYSTEM, PROGRAM FOR DETERMINING FREQUENCY OF UPDATING DATABASE HISTOGRAMS

(75) Inventor: Ivan Popivanov, Markham (CA)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 10/885,532

(22) Filed: Jun. 29, 2004

(65) Prior Publication Data

US 2005/0289191 A1    Dec. 29, 2005

(51) Int. Cl.
G06F 17/30    (2006.01)

(52) U.S. Cl. .............................. 707/200; 707/1; 707/2; 382/170

(58) Field of Classification Search .................... 707/1; 382/170; 356/357
See application file for complete search history.

(56) References Cited

U.S. PATENT DOCUMENTS

| | | | |
|---|---|---|---|
| 5,870,196 A * | 2/1999 | Lulli et al. .................. 356/511 |
| 5,870,752 A * | 2/1999 | Gibbons et al. ............ 707/102 |
| 6,038,341 A | 3/2000 | Takeshima et al. ......... 382/168 |
| 6,181,817 B1 | 1/2001 | Zabih et al. ................. 382/170 |
| 6,201,176 B1 * | 3/2001 | Yourlo ......................... 84/609 |
| 6,278,989 B1 * | 8/2001 | Chaudhuri et al. ............ 707/2 |
| 6,460,045 B1 * | 10/2002 | Aboulnaga et al. ......... 707/102 |
| 6,507,668 B1 | 1/2003 | Park ............................ 382/169 |
| 6,850,925 B2 * | 2/2005 | Chaudhuri et al. ............ 707/2 |
| 6,957,387 B2 * | 10/2005 | Barbieri ....................... 715/719 |
| 7,007,039 B2 * | 2/2006 | Chaudhuri et al. ......... 707/200 |
| 7,010,516 B2 * | 3/2006 | Leslie ............................ 707/2 |
| 2002/0087518 A1 * | 7/2002 | Ellis et al. ..................... 707/2 |
| 2002/0168106 A1 * | 11/2002 | Trajkovic .................... 382/170 |
| 2002/0198896 A1 * | 12/2002 | Chaudhuri et al. ......... 707/200 |
| 2003/0018615 A1 * | 1/2003 | Chaudhuri et al. ............ 707/1 |
| 2003/0028631 A1 * | 2/2003 | Rhodes ........................ 709/224 |
| 2003/0055813 A1 * | 3/2003 | Chaudhuri et al. ............ 707/3 |
| 2003/0088542 A1 * | 5/2003 | McGee et al. ................. 707/1 |
| 2003/0135485 A1 * | 7/2003 | Leslie ............................ 707/3 |
| 2004/0122845 A1 * | 6/2004 | Lohman et al. ............. 707/102 |
| 2004/0236762 A1 * | 11/2004 | Chaudhuri et al. ......... 707/100 |
| 2005/0131914 A1 * | 6/2005 | Abdo et al. ................. 707/100 |

OTHER PUBLICATIONS

Mannino, Michael et al., "Statistical Profile Estimation in Database Systems", ACM Computing Services vol. 20, No. 3, Sep. 1998.*

* cited by examiner

Primary Examiner—Cam-Y Truong
Assistant Examiner—Dennis Myint
(74) Attorney, Agent, or Firm—Sughrue Mion, PLLC (57) ABSTRACT

A method, system and computer program product for a database management system to be operatively coupled to a data processing system. The data processing system includes memory for storing a data table. The method, system and computer program product for determining frequency of updating a histogram of the data table. The method includes determining sampled histograms for sample portions of the data table from time to time, computing a difference between at least two of the determined sampled histograms, and determining a frequency with which to update the histogram of the data table depending on the amount of the computed difference.

10 Claims, 13 Drawing Sheets

FIG. 1

| DATA TABLE 126 | | |
|---|---|---|
| 202 NAME | 204 SALARY | 206 DATE BEGAN EMPLOYMENT |
| SMITH | $15,000 | SEPT. 20, 2000 |
| JONES | $21,000 | DEC. 1, 1996 |
| KRAMDEN | $26,000 | FEB. 3, 1992 |
| ... | ... | ... |

HISTOGRAM COMPARISON TABLE 132

| 710 DIFFERENCE BETWEEN HISTOGRAMS (X) | 712 PRESET THRESHOLD (Y) | 714 PROSCRIBED ACTION |
|---|---|---|
| 80 | 75 | IF X > Y, UPDATE SALARY HISTOGRAM MORE FREQUENTLY. IF X < Y, UPDATE SALARY HISTOGRAM LESS FREQUENTLY. |

OPERATION S900 OF STATISTICAL ANALYSIS SYSTEM 102 OF FIG. 1

OPERATION S1000 OF DBMS 100 OF FIG. 1

METHOD, SYSTEM, PROGRAM FOR DETERMINING FREQUENCY OF UPDATING DATABASE HISTOGRAMS

FIELD OF THE INVENTION

The present invention relates to database management systems, and more specifically relates to a method, a system and a computer program product for determining frequency of updating database histograms.

BACKGROUND

Object (e.g., table, index, etc) histograms are an important aspect of a database. Histograms are used by a query optimizer of a database management system (DBMS) to estimate the cost of alternative data access plans (for a given database query) for accessing the data stored in a data table contained in the database, and to select the most efficient data access plan for that data table. Therefore the task of recomputing histograms for a data table is an important task to be executed by the DBMS so that the most cost effective access plan may be selected for database queries to be received in the future.

There are known methods for directing the DBMS to compute histograms for a data table, such as for example the Chi-Square test, the Kolmogorov-Smirnov test, etc. However, these known methods have drawbacks. The DBMS may use the Kolmogorov-Smirnov to examine histograms which may indicate a measure of a "maximum estimation error" that the query optimizer may incur for a particular histogram. Reliance on the Kolmogorov-Smirnov test may cause the DBMS to experience difficulty in determining just when it may be desirable to recompute histograms for each column of the data table.

Accordingly, a solution is desired that addresses, at least in part, these shortcomings.

SUMMARY

The present invention obviates or mitigates at least some of the above mentioned disadvantages.

In a first aspect of the present invention, there is provided, for a database management system to be operatively coupled to a data processing system, the data processing system comprising memory for storing a data table, a method of determining frequency of updating a histogram of the data table, the method including determining sampled histograms for sample portions of the data table from time to time, computing a difference between at least two of the determined sampled histograms, and determining a frequency with which to update the histogram of the data table depending on the amount of the computed difference.

In a second aspect of the present invention, there is provided a database management system to be operatively coupled to a data processing system, the data processing system comprising memory for storing a data table, a method of determining frequency of updating a histogram of the data table, the database management system including means for determining sampled histograms for sample portions of the data table from time to time, means for computing a difference between at least two of the determined sampled histograms, and means for determining a frequency with which to update the histogram of the data table depending on the amount of the computed difference.

In a third aspect of the present invention, there is provided for a database management system to be operatively coupled to a data processing system, the data processing system comprising memory for storing a data table, a computer programmed product for directing the database management system to determine frequency of updating a histogram of the data table, the computer programmed product including a computer readable medium for tangibly transporting computer executable code, the computer executable code including code for determining sampled histograms for sample portions of the data table from time to time, code for computing a difference between at least two of the determined sampled histograms, and code for determining a frequency with which to update the histogram of the data table depending on the amount of the computed difference.

BRIEF DESCRIPTION OF THE DRAWINGS

A better understanding of these and other embodiments of the present invention may be obtained with reference to the following drawings and detailed description of the preferred embodiments, in which.

Similar references are used in different figures to denote similar components.

DETAILED DESCRIPTION OF THE EMBODIMENTS

The following detailed description of the embodiments of the present invention does not limit the implementation of the embodiments to any particular computer programming language. The computer program product may be implemented in any computer programming language provided that the OS (Operating System) provides the facilities that may support the requirements of the computer program product. A preferred embodiment is implemented in the C or C++ computer programming language (or may be implemented in other computer programming languages in conjunction with C/C++). Any limitations presented would be a result of a particular type of operating system, computer programming language, or data processing system and would not be a limitation of the embodiments described herein.

Figure 1:
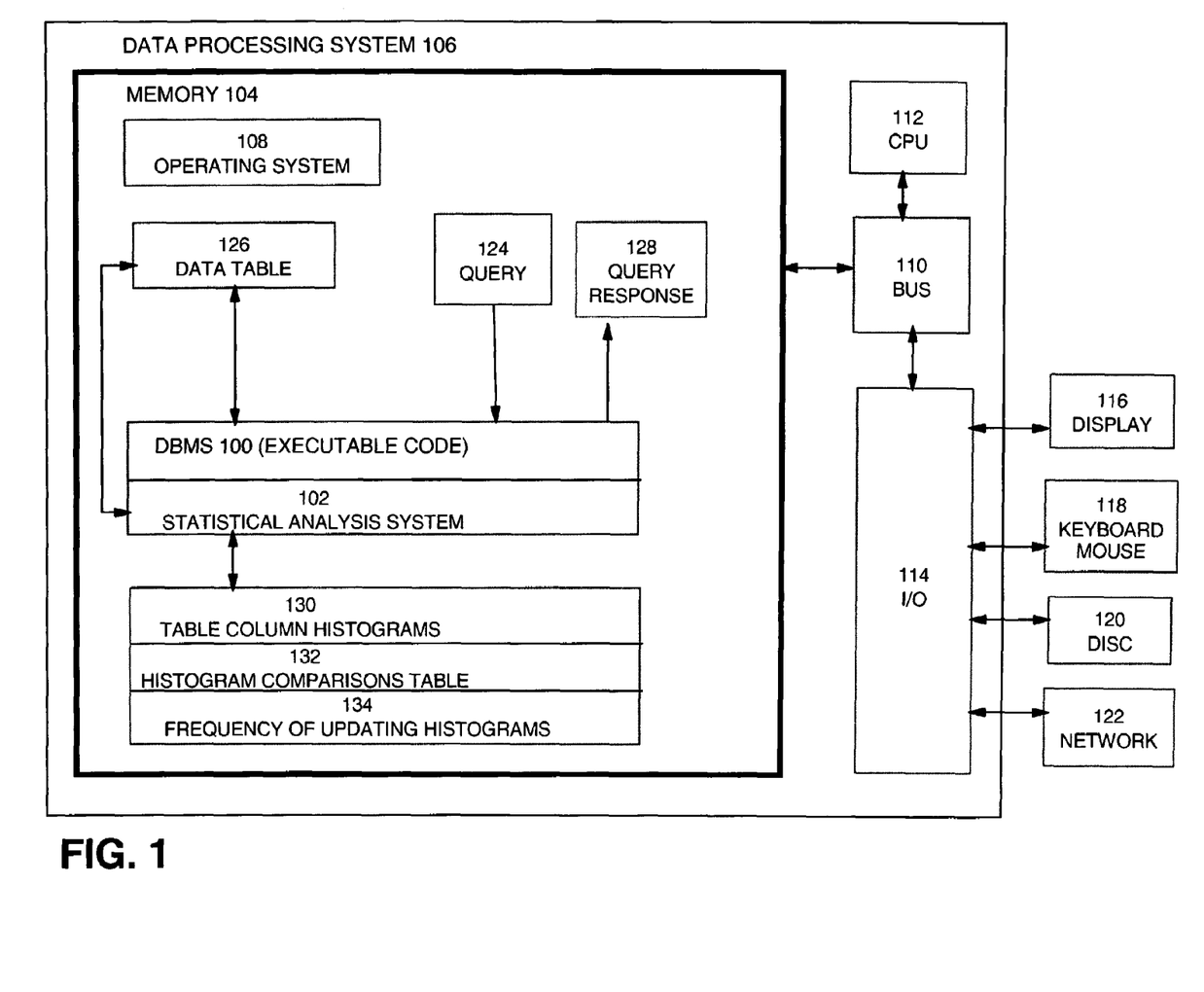
FIG. 1 shows a statistical analysis system (SAS) coupled to a database management system (DBMS) installed in a data processing system (DPS) having memory for storing a data table, table column histograms, a histogram comparison table and a frequency for updating table column histograms.

FIG. 1 shows a statistical analysis system (SAS) 102 coupled to a database management system (DBMS) 100 installed in a memory 104 of a data processing system (DPS)

106. The memory 104 is used for storing a data table 126, table column histograms 130, a histogram comparisons table 132 and frequency of updating table column histograms 134. The DBMS 100 and the SAS 102 include computer executable code which directs the DPS106 perform operations to be detailed further below. A compiler (not depicted) was used to generate the computer executable code by compiling source code (not depicted) having computer programming instructions. The source code was written in a high level computer programming language. A person skilled in the art may be able to derive the source code by inspection of the operations of the DBMS 100 and SAS 102 to be provided further below.

The memory 104 is operatively coupled to a bus 110. Operatively coupled to the bus 110 is a central processing unit (CPU) 112 and an input/output interface (I/O) 114. The CPU 112 executes the computer executable code included in DBMS 100 and the SAS 102. Operatively coupled to the I/O 114 is a display unit 116 for displaying a query response 128 generated by the DBMS 100 and/or for displaying other output derived from the SAS 102, a keyboard and mouse 118 for inputting a query 124 and/or other commands from a user, a disc 120 and a network 122. The disc 120 is a computer program product having a computer readable medium tangibly embodying and transporting the computer executable code to the memory 104 via the I/O 114 and the bus 110. Also, the network 122 includes a signal carrier which may be considered to be a computer program product which may also embody and transport the computer executable code to the memory 104 via the I/O 114 and the bus 110.

The memory 104 includes an operating system 108 which takes care of basic operating requirements of the DPS 106. The memory 104 stores the data table 126 which includes data organized into table columns. The DBMS 100 and the SAS 102 both interface and interact with the data table 126. The SAS 102 interacts with the table column histograms 130 and the histogram comparisons table 132 and the frequency of updating histograms 134. The operations used by the DBMS 100 and the SAS 102 for interacting with the data table 126, the table column histograms 130, the histogram comparisons table 132 and the frequency of updating histograms 134 will be described further below.

Figure 2:
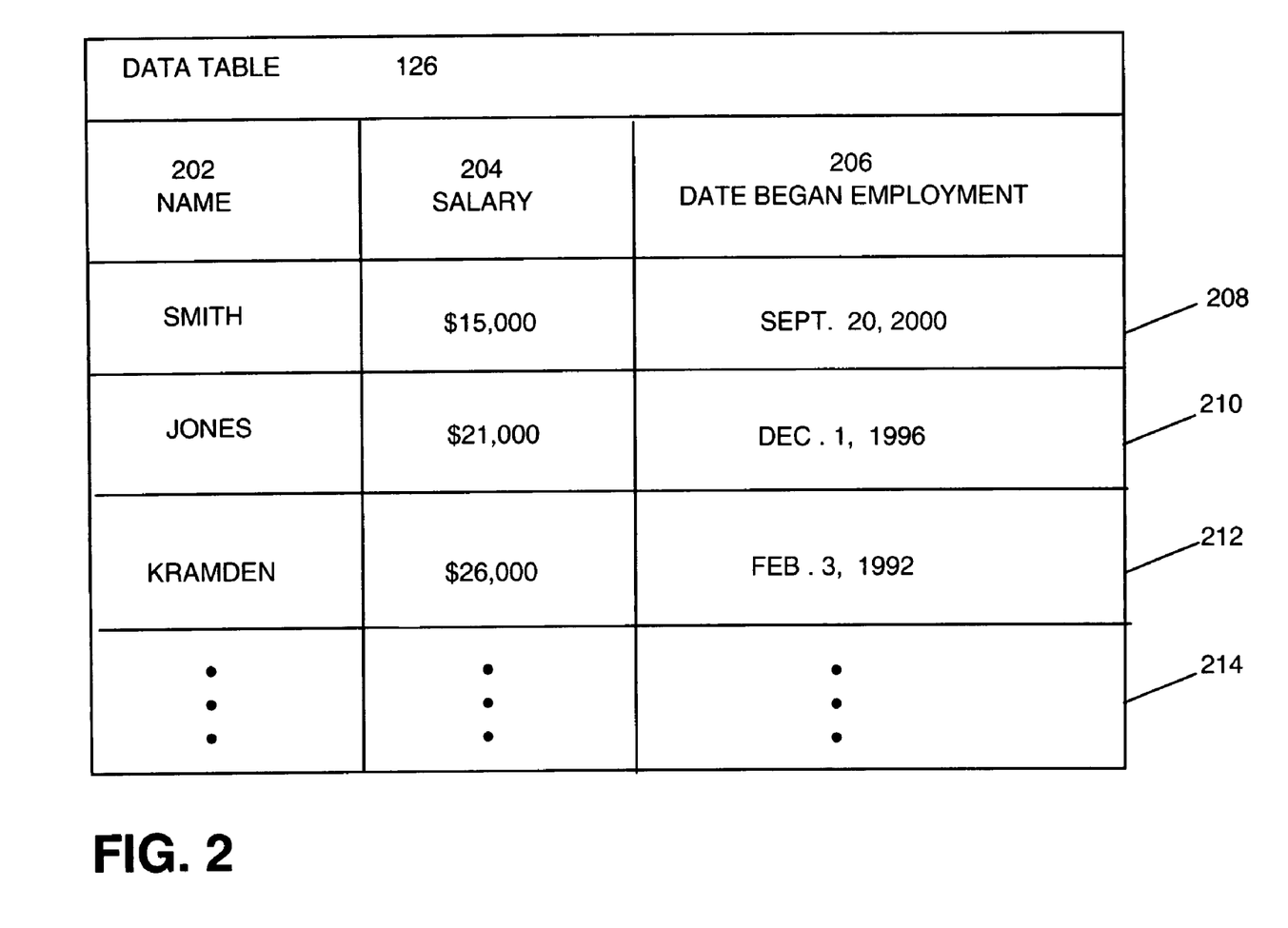
FIG. 2 shows the data table of FIG. 1.

FIG. 2 shows the data table 126 of FIG. 1. The data table 126 includes three columns. Column 202 is labeled NAME, column 204 is labeled SALARY, and column 206 is labeled DATE BEGAN EMPLOYMENT. The DBMS 100 manages the data contained in the data table 126 by following user requests and commands received via keyboard 118.

Table rows 208, 210, 212 and 214 all contain data under table columns 202, 204 and 206. For example: in row 208 data SMITH under the column NAME 202 is associated with a salary of $15,000 under column SALARY 204. Similarly in the table row 210, data JONES is associated with a salary of $21,000. Likewise in row 214, data KRAMDEN is associated with a salary of $26,000. Typically, the data table 126 may be approximately one terabyte in size or larger. The example shown in the data table 126 is but a portion contained in the data table 126.

Figure 3:
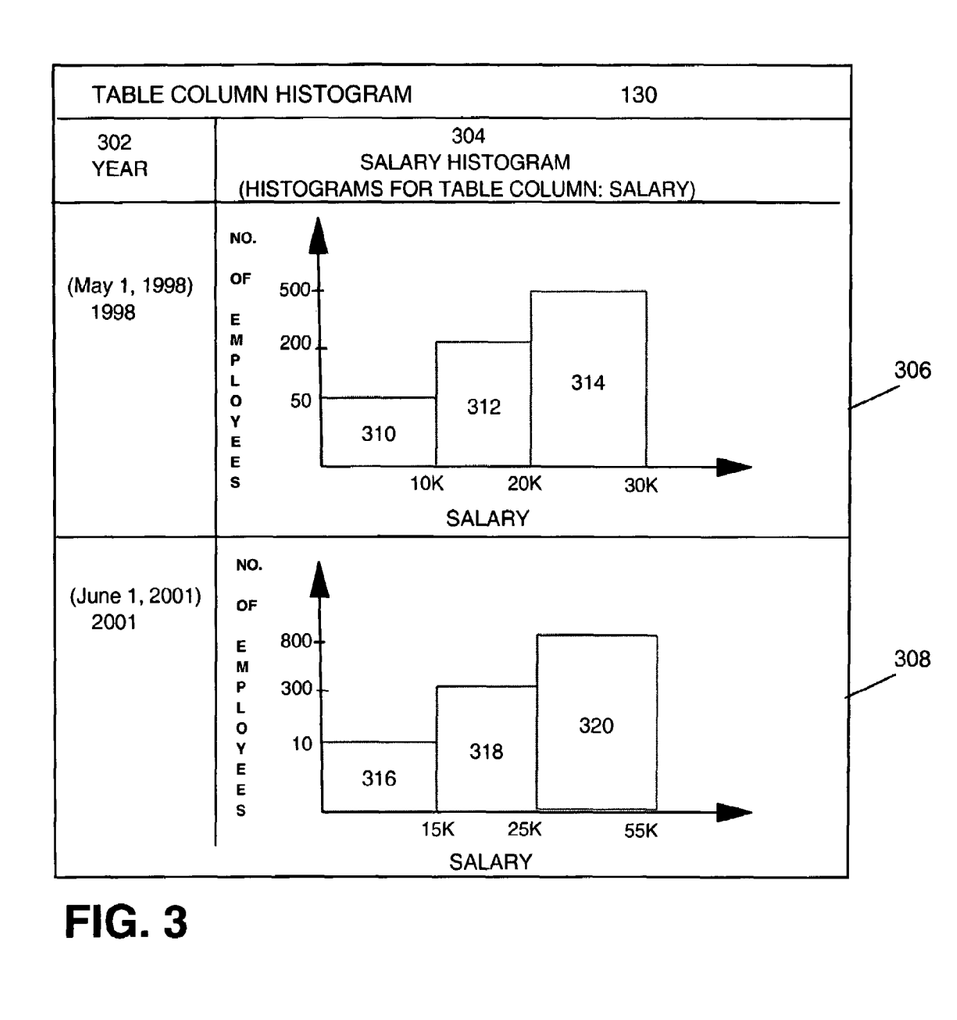
FIG. 3 shows the table column histograms of FIG. 1.

FIG. 3 shows the table column histograms 130 of FIG. 1. The table 130 includes a column YEAR 302 and another column SALARY HISTORGRAM 304. The SAS 102 computes the histograms for a table column of the data table 126. The SAS 102 computes the histograms and inserts them into the table column histograms 130. A table column 304 contains histograms associated with the column SALARY of the data table 126 (i.e., column SALARAY 204 of the data table 126).

Table rows 306, 308 of the table column histograms 130 store specific histograms taken at different points in time (as indicated in column 302 of each table row 306, 308). For example table row 306 shows the salary histogram computed on May 1, 1998. The histogram shown in table row 306 shows the salary histogram computed on Jun. 1, 2001. Between May 1, 1998 and Jun. 1, 2001, the SAS 102 did not compute any other salary histograms during that time period.

For each histogram in the table column 304, salary is shown along the x-axis. Along the y-axis there is shown the number of employees contained in the data table 126. These histograms show a distribution of the employee salaries stored in the data table 126 of FIG. 2.

The histograms in column 304 are shown as containing a group of quantiles or sections. Each section has a high value and a low value along the x-axis. Histograms, in general, narrow the areas where the majority of the table row values (contained in the data table 126) are concentrated. Without a histogram, an optimizer (not depicted) contained in the DBMS 100 assumes that the data contained the data table 126 is distributed uniformly. With a histogram the optimizer may assume uniformity inside each section. So given two histograms, the SAS 102 computes a measure by how much the histograms differ. The optimizer uses the histograms to estimate filter factors for query predicates, as known to those skilled in the art.

Referring to the histogram contained in table row 306, there is a portion or section 310 of the histogram. Also included in the histogram are a section 312 and a section 314. The section 310 indicates that there are 50 employees (as read off the y-axis) that have a salary between 0 and $10,000 per year. The section 312 indicates that there are 200 employees having a salary between $10,000 and $20,000 per year. The section 314 indicates that there are 500 employees having a salary between $20,000 and $30,000 per year.

The table row 308 shows another histogram computed on Jun. 1, 2001. Sections 316, 318 and 320 of this histogram shown in the table row 308 indicate that for the section 316 there are 10 employees that have a salary between $0 and $15,000 per year, for the section 318 there are 300 employees that have a salary of between $15,000 and $25,000 per year, and for section 320 there are 800 employees that have a salary between $25,000 and $55,000 per year.

Figure 4:
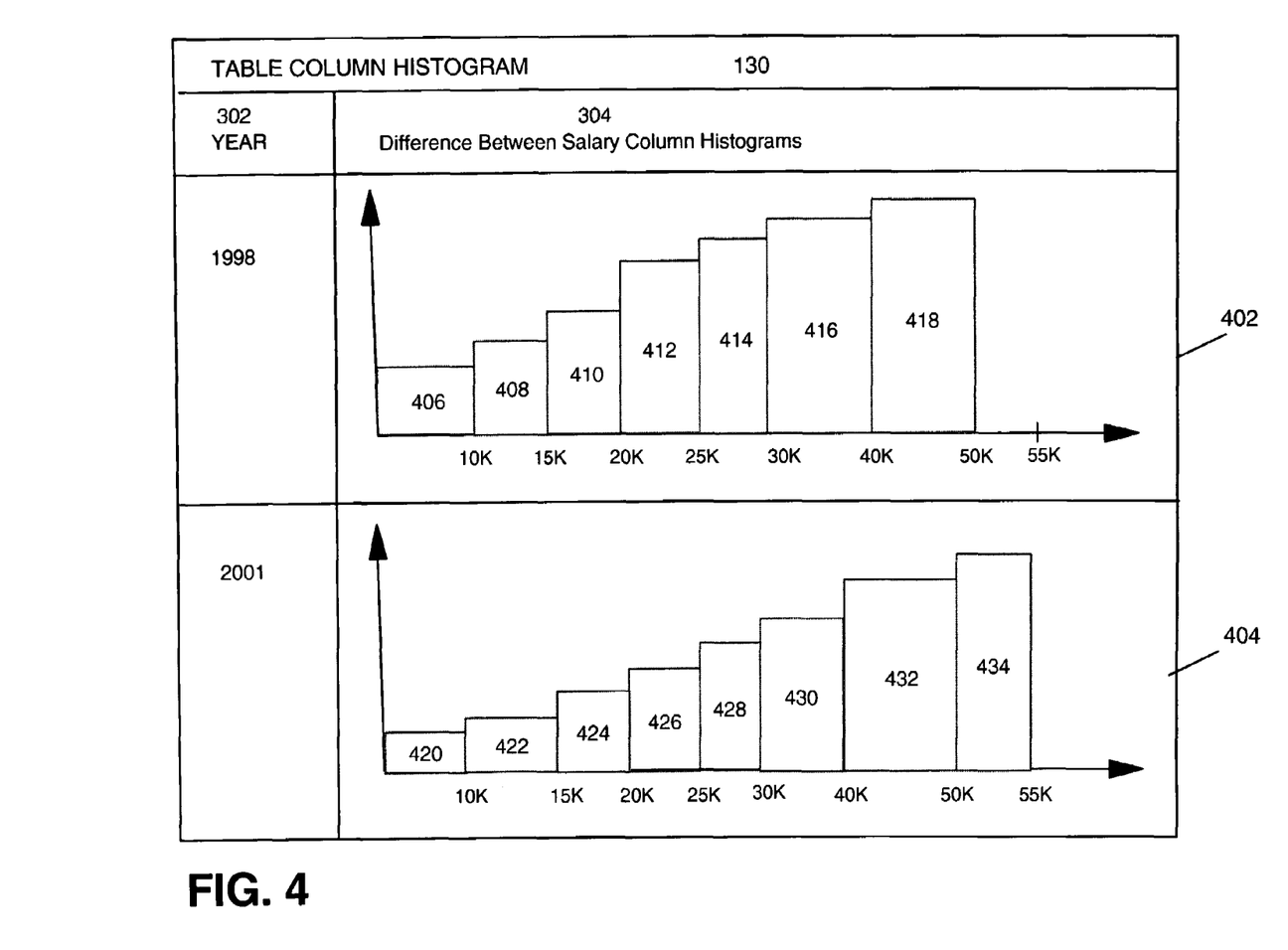
FIG. 4 shows the table column histograms of FIG. 1, in which the table column histograms are readjusted along their x-axis.

FIG. 4 shows the table column histograms 130 of FIG. 1. The SAS 102 readjusts the table column histograms 130 along their x-axis so the sections of each histogram match up or correspond with each other. The table column histogram 130 includes table columns: YEAR 302 and SALARY HISTORGRAM 304.

A table row 402 shows a histogram for 1998 (which is the histogram taken from the table row 306 of FIG. 3) in which this histogram has had its sections readjusted to match up with corresponding sections of the histogram indicated in a table row 404. The table row 404 shows a histogram (which was taken from the table row 308 of FIG. 3) which has had its sections readjusted to match up with the sections of the histogram shown in the table row 402. Adjustments have been made to the histograms of FIG. 3 so that the two corresponding histograms shown in FIG. 4 have their x-axis or their salary axis partitioned or sectioned so that they share the same section lengths.

Referring back to FIG. 3, the histogram contained in the table row 306 shows that the x-axis or the salary axis is partitioned at 10K, 20K, and 50K, while the histogram contained in the table row 402 of FIG. 4 is the same histogram but distributed in a way that the histogram now has been slit up and partitioned or sectioned at 10K, 15K, 20K, 25K, 30K, 40K and 50K.

Referring back to FIG. 3, the histogram contained in the table row 308 shows the x-axis sectioned at 15K, 25K, and 55K, while the histogram contained in the table row 404 is the same histogram but distributed or sectioned at 10K, 15K, 20K, 25K, 30K, 40K, 50K and 55K (for example).

In another example, the histogram contained in the table row 404 may be sectioned at 10K, 15K, 20K, 25K, 30K and 55K.

It is to be noted that the histograms contained in the table rows 402 and 404 have sections which correspond with each other. Sections 406, 408, 410, 412, 414, 416 and 418 of histogram contained in the table row 406 correspond with sections 420, 422, 424, 426, 428, 430, 432 and 434 of the histogram contained in the table row 404 respectively.

Figure 5:
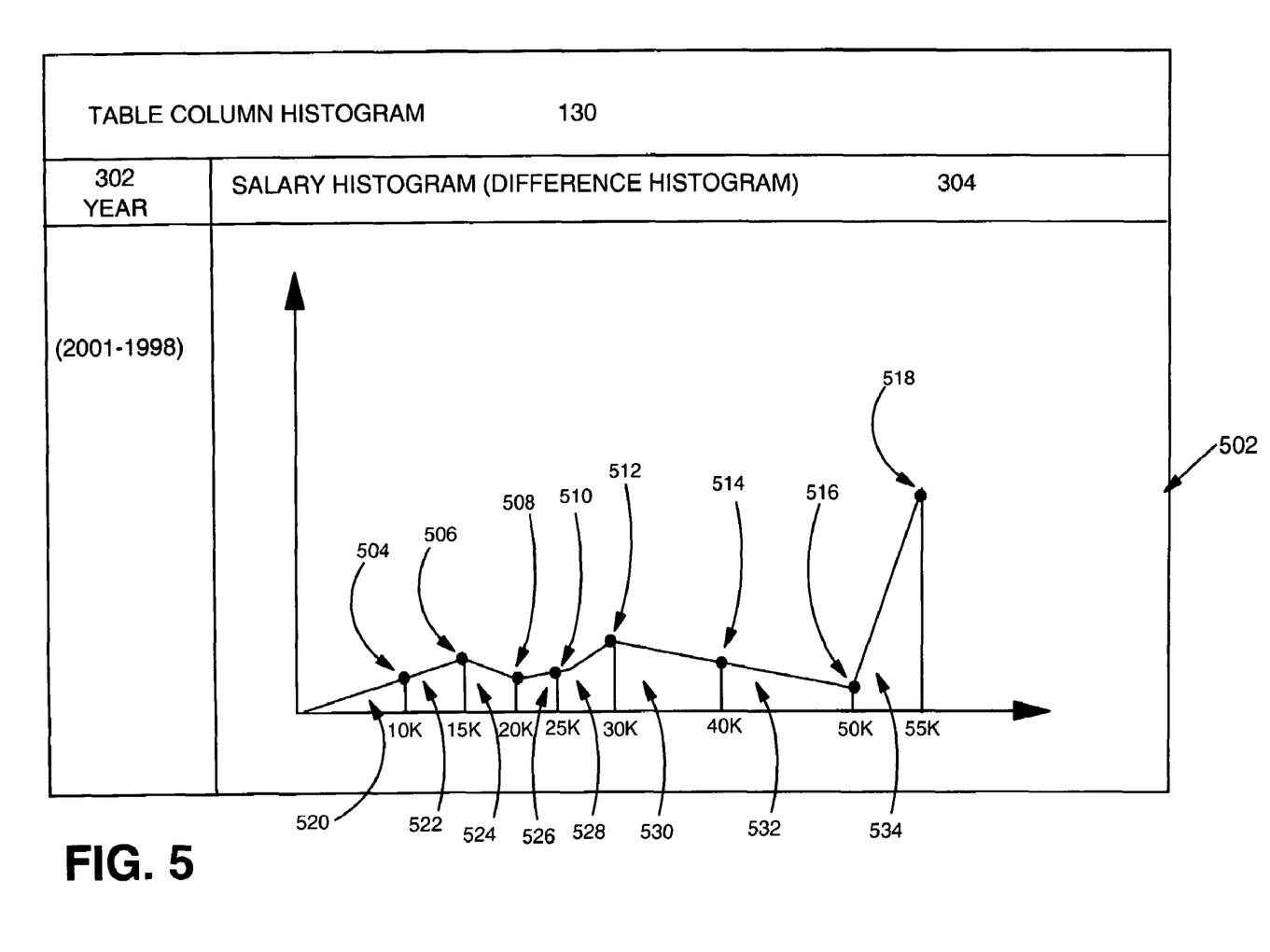
FIG. 5 shows a difference between the table column histograms shown in FIG. 4.

FIG. 5 shows a difference between the table column histograms shown in FIG. 4. The difference is displayed as a graph, by way of example, which indicates the difference between the table column histogram. The SAS 102 computes a difference histogram, which may be called a function or a histogram difference function. The table column histogram 130 includes a table row 502 that stored or contains a difference histogram function. The difference histogram function is computed as a mathematical subtraction between the histogram of the table row 402 and the histogram contained in the table row 404 of FIG. 4. Generally, the algorithm is a subtraction between two query response size estimates, calculated using the first and the second histogram. Then the difference between any two queries is averaged over the whole area covered by the histogram.

The difference histogram contained in the table row 502 includes series of points 504, 506, 508, 510, 512, 514, 516 and 518 each having a value computed by the SAS 102. The value of the point 504 is computed as follows: the value of section 406 is subtracted from the value associated with section 420 (i.e., the value indicated along the y-axis) and that computed difference number is plotted as the point 504. The value of the point 506 was computed by taking the value associated with section 408 and subtracting it from the value associated with section 424 and then displayed in the histogram of table row 502. Similarly, points 508, 510, 512, 514, 516, and 518 were all computed in a similar fashion. The point 516 is computed by taking the value associated with the section 418 and subtracting it from the value of the section 432. The point 518 is computed as follows: since the histogram of contained in table row 402 does not include a section between 50K and 55K a zero value is associated with that section and it is subtracted from the value of section 434, and that difference is then plotted as the value of the point 518.

Alternatively, the value associated with the last section may not be a zero. For example, if the response size of the query "How many people have salary less then 53K" is estimated using the first histogram (306, the one that ends with 30K), the answer may be "every single person from the table". Same query estimated using the other histogram may return something like 767 (out of 800) for example.

All the points are connected with line segments as shown in the histogram of table row 502.

The SAS 102 computes an area for each section shown in the difference histogram of table row 502. This difference histogram includes sections 520, 522, 524, 526, 528, 530, 532, and 534. The areas of these sections are computed and totaled and used at another processing step as will be shown further below.

Generally, the SAS 102 compares a geometric aspect of the difference histogram against a preset threshold level value. An example of the geometric aspect is a computed total of the areas of each section of the difference histogram of table row 502, which is then compared against a preset threshold level. Another example of the geometric aspect of the difference histogram is computing the perimeter lengths of each section of the difference histogram. Another example is computing the length of the lines across the top of the difference histogram.

Later, the SAS 102 compares the computed total of the section areas associated with the histogram of table row 502 against a preset threshold level and then the SAS 102 decides whether the histograms are similar or not similar. The SAS then resets a date stored in the frequency of updating histograms 134 depending on the result of the comparison of the total area under the difference histogram curve with the preset threshold level.

Alternatively, the SAS 102 may use the area below the difference histogram in another manner. The SAS 102 may compute the area under the difference histogram curve and then divide the computed area by the maximum length of the value along the x-axis (the right end minus the left end of the difference histogram for example). This metric may be referred to as an "average area difference", and may be treated as the average difference between the two histograms over all possible queries. The error that may be observed may be significant over a small interval and may be negligible over a wide interval as in the example; therefore, if the absolute value of the error were used, this computation may mislead. However, if the error is averaged over the entire x-axis range, the error becomes more negligible.

Figure 6:
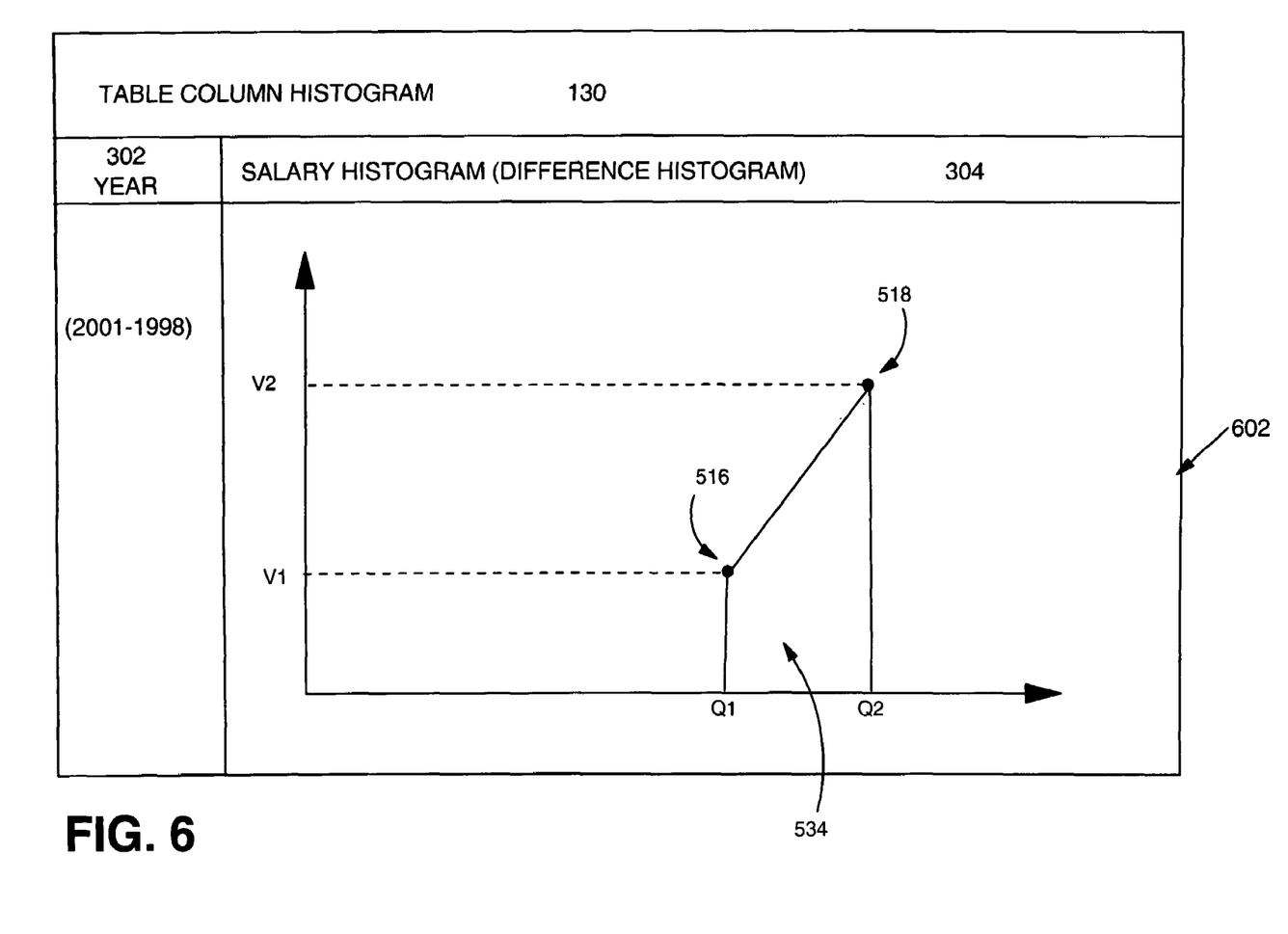
FIG. 6 shows a portion of the difference between histograms of FIG. 5.

FIG. 6 shows a portion of the difference between histograms of FIG. 5. A portion of the histogram contained in the table row 502 is shown as a new table row 602 for illustrating the manner in which the area 534 is computed by the SAS 102.

The area 534 is a trapezium. The section begins at Q1 and ends at Q2 with the area of interest falling between these two points. The value of the difference at Q1 is V1, and the value of the difference at Q2 is V2. According to a known mathematical formula, the area of this shape is equal to half of the sum of the bases times the height of the trapezoid. In this case the bases are the values of the difference at the beginning and at the end of the quantile (i.e., section), V1 and V2 respectively. Therefore, these values can be determined and used in the formula for the area of a trapezium. This area may be added to the current area calculated for the previous quantiles.

The area is computed to be according to Equation 1 below:

$$\frac{(V_1 + V_2)}{2}(Q_2 - Q_1) \qquad \text{(Equation 1)}$$

At the end the area is divided by the total width of all sections (right end minus the left end for the whole difference histogram) and this yields the average area under the difference histogram. The area for this quantile is determined according to Equation 1.

Figure 7:
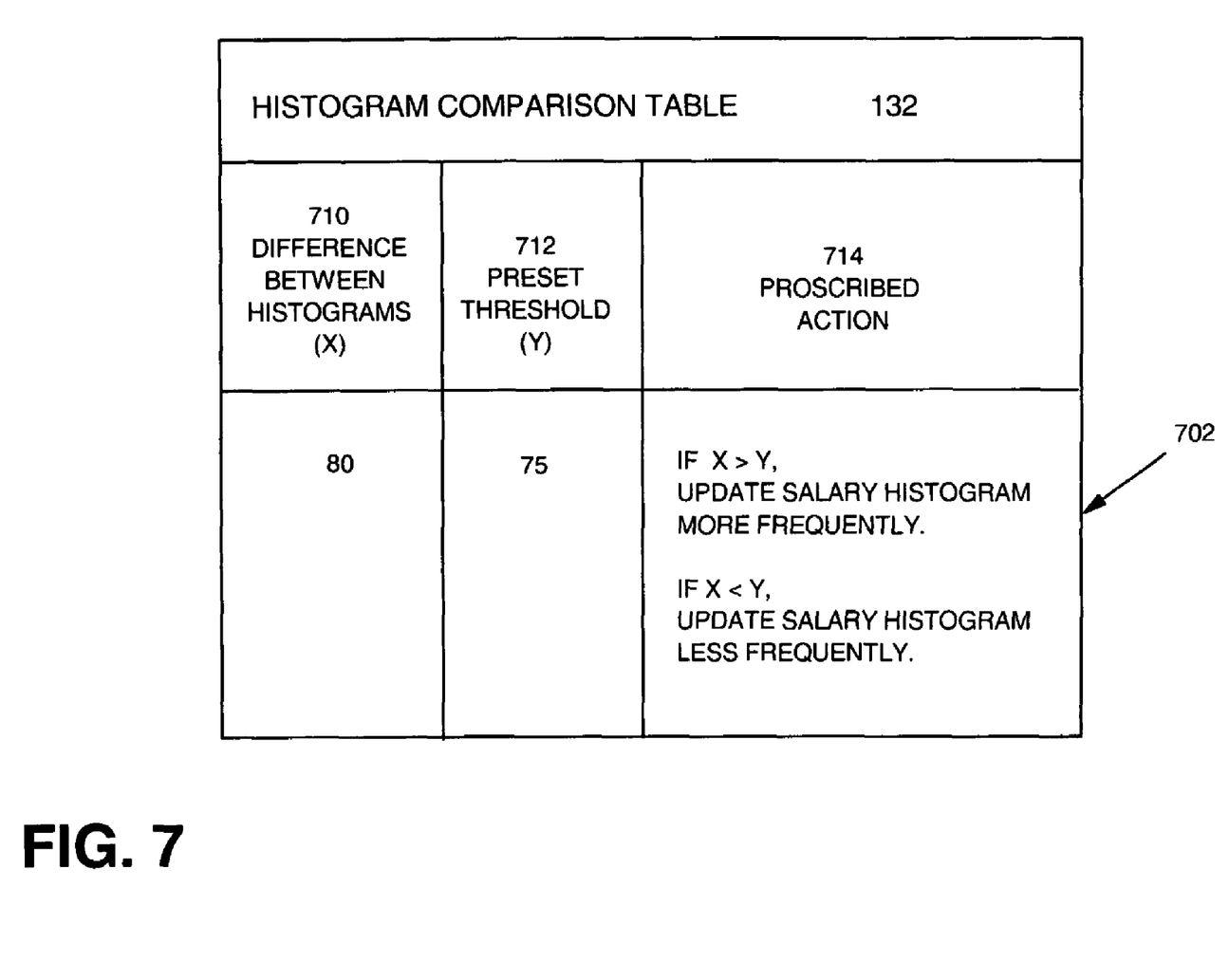
FIG. 7 shows a computed difference between two histograms, and the computer difference is compared against a preset threshold level.

FIG. 7 shows a computed difference between two histograms which is compared against a preset threshold level. This information may be contained in the histogram comparisons table 132 or some other convenient location in memory 104.

The histogram comparisons table 132 includes a table column 710 titled DIFFERENCE BETWEEN HISTOGRAMS, a table column 712 titled PRESET THRESHOLD, and a table column 714 titled PRESCRIBED ACTION (i.e., action to be taken by the SAS 102). A table row 702 contains computations made by the SAS 102 pertaining to the difference between two histograms contained in the table row 502, and the corresponding comparison of that difference against a threshold level.

The table column 710 stores the computed difference between two histograms which is, by example, 80 indicated as (X). The table column 712 stores the pre-set threshold value which is, by example, 75 indicated as (Y). The table column 714 stores the prescribed action to be taken by the SAS 102 depending on the outcome of the comparison made between the table column 704 or 708 and the table column 712. One prescribed action is if the value of (X) is greater than or less than the value of (Y), the action to be taken by the SAS 102 is to update the salary histogram more frequently than what may be indicated at the present time. Another prescribed action is if (X) is less than (Y), the SAS 102 should update the salary histogram less frequently than what may be indicated at the present time.

Figure 8:
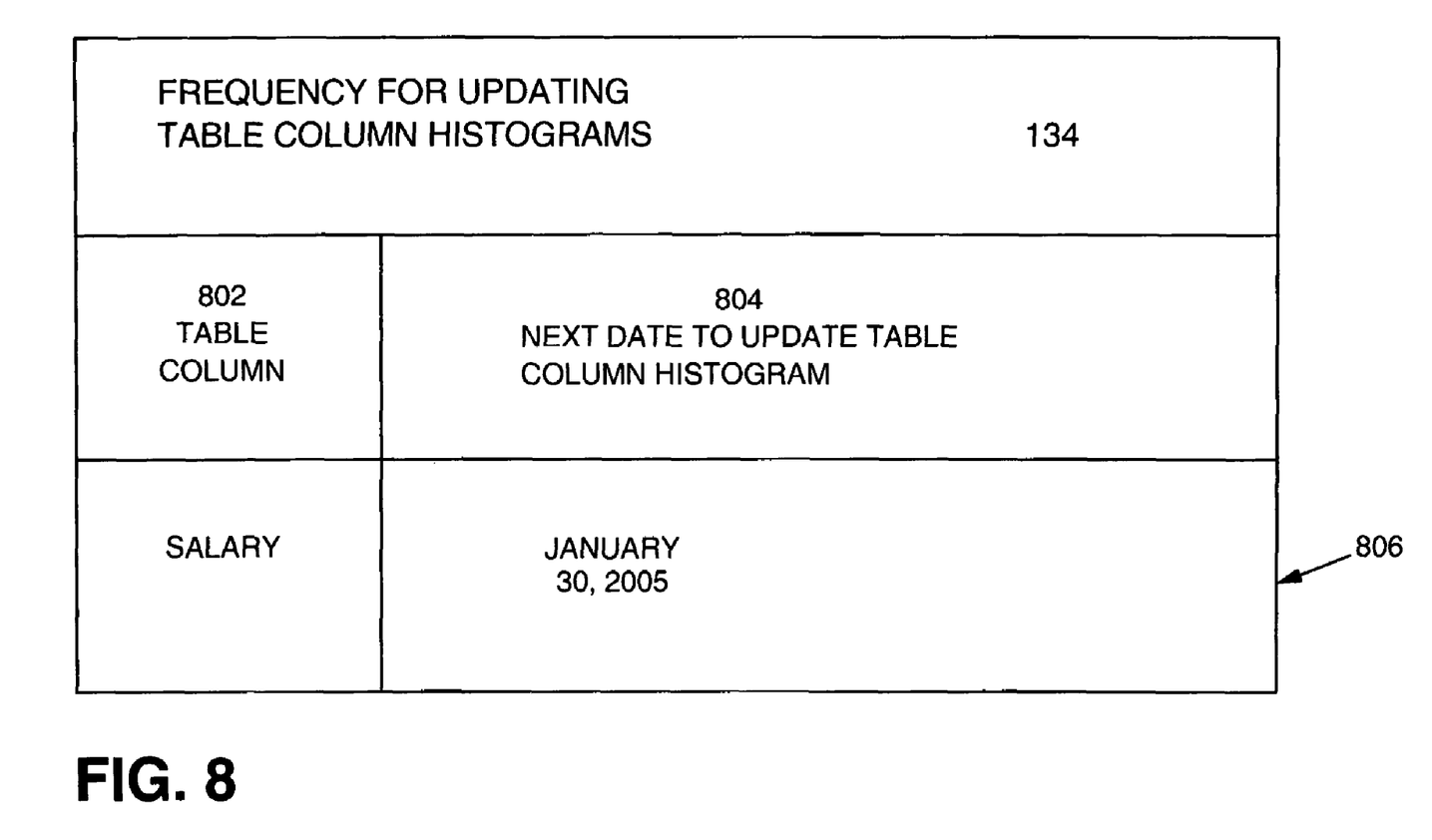
FIG. 8 shows the frequency for updating table column histograms of FIG. 1.

FIG. 8 shows the frequency for updating table column histograms 134. The table 134 includes a table column 802 which identifies a specific table column of the data table 126. A table column 804 stores the next date in which the SAS 102 is to update the table column histogram associated with the identified table column 802. For example, the table column 802 identifies the table column SALARY of the data table 126. The table column 804 contains a date (for example, Jan. 30, 2005) which is the next date that the SAS 102 is to update the table column histogram for the table column SALARY of the data table 126. Referring back to FIG. 7, if the prescribed action directs the SAS 102 to update the salary histogram more frequently, a new date is inserted in the table row 806 (under the table column 802), such as Jan. 30, 2004 for example. Or, if the prescribed action is to update the salary histogram less frequently, the SAS 102 is directed to insert another date, such as Jan. 30, 2006 for example, in the table row 806 (under the table column 802).

FIGS. 9A, 9B, 9C and 9D show operation S900 of the SAS 102 of FIG. 1. Step S902 includes beginning the operation of the SAS 102.

Figure 9A:
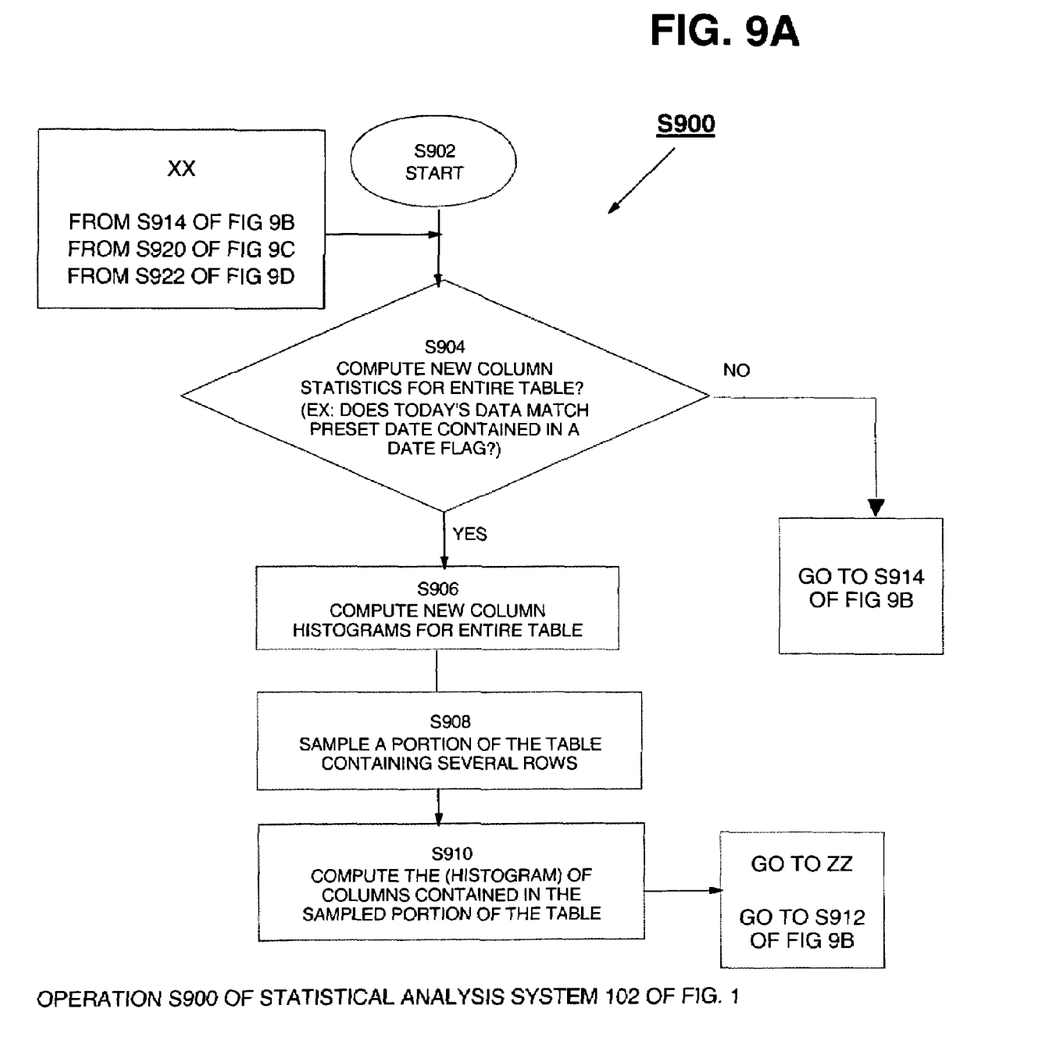
FIGS. 9A, 9B, 9C and 9D show operation of the SAS of FIG. 1.

Operation S904 includes determining whether to compute a new column histogram for each column in the data table 126. For example, operation S904 may determine whether today's date matches the preset date contained in a date flag (for example, the date flag indicated in FIG. 8). If the determination is NO, then the SAS102 waits for an amount of time and then SAS102 repeats the operation S904 again (in other words, the SAS102 waits until the prescribed date becomes today's date). However, if the determination is YES, control may then be transferred over to operation S906. Operation S904 is a check of whether it's time to recomputed the histograms (by referring to a date flag); if it's not time to recomputed the histograms, then operation may exit (that is, check the date flag later) for example; and if it is time to recomputed the histograms, then control is transferred over to operation S908. A histogram is not recomputed in operation S906. In other words, if the current date is past the date flag, control is transferred over to operation S908.

Operation S906 includes computing new column histograms for each column of the data table 126 since the operation S904 has determined that it is time to do so.

Operation S908 includes sampling a portion of the data table 126, the portion containing only several rows of the data table 126.

Operation S910 includes computing histograms for each column contained in the sampled portion of the data table 126, then adjusting the corresponding sections of each computed histogram so as to correspond with sections of the previously computed histograms (as discussed above for FIG. 4), then computing a difference histogram for each table column (as discussed above for FIG. 5), and then computing the total area under the difference histogram curve (as discussed above for FIG. 6).

Figure 9B:
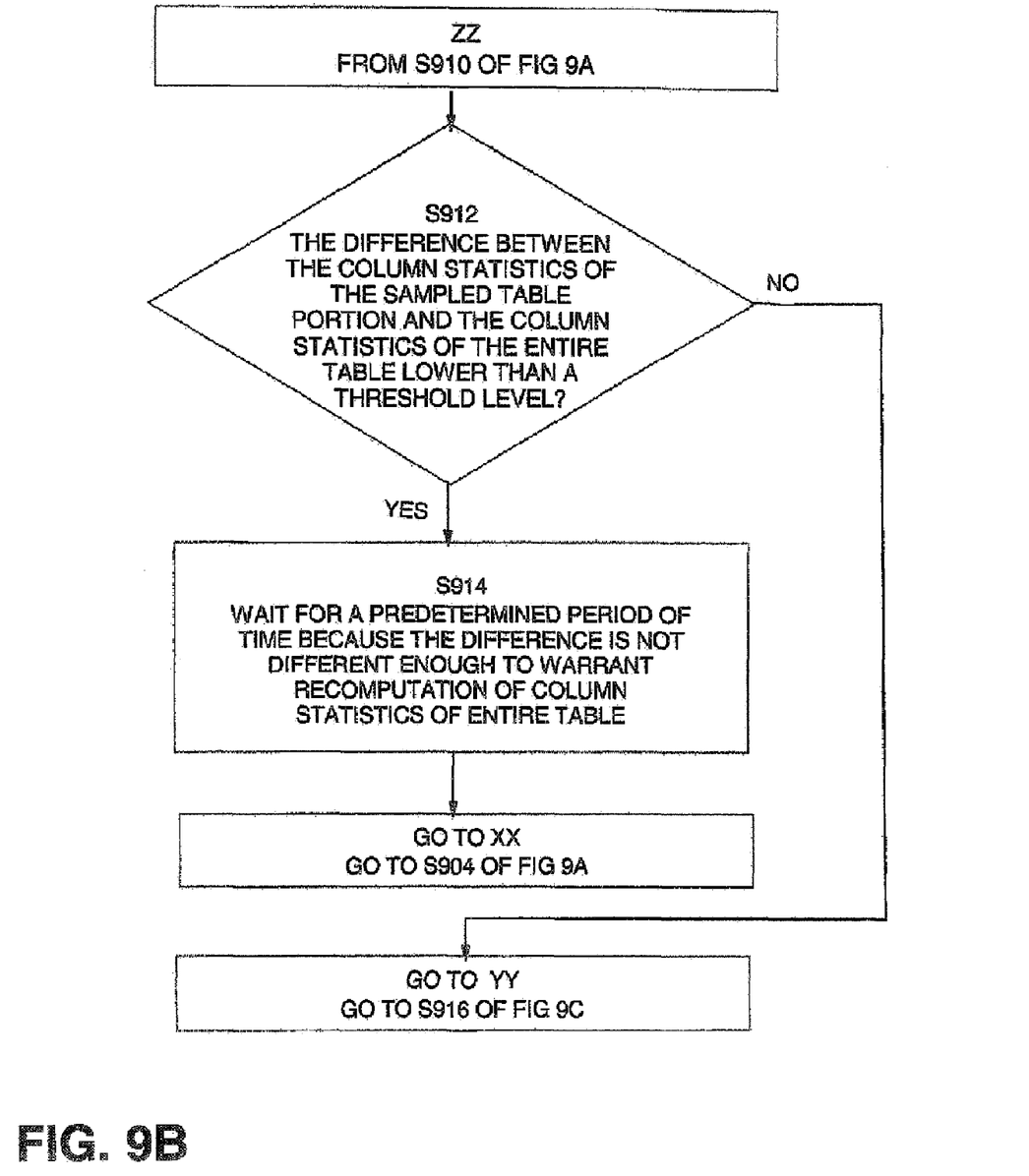

Operation S912 includes determining whether the areas computed for each difference histogram are lower than a preset threshold level value (as discussed above for FIG. 7). If the determination is YES (that is, the computed area is lower than the preset threshold level), control is then transferred over to operation S914. If the determination is NO (that is, the computed area is higher), control may then be transferred over to operation S916.

Figure 9C:
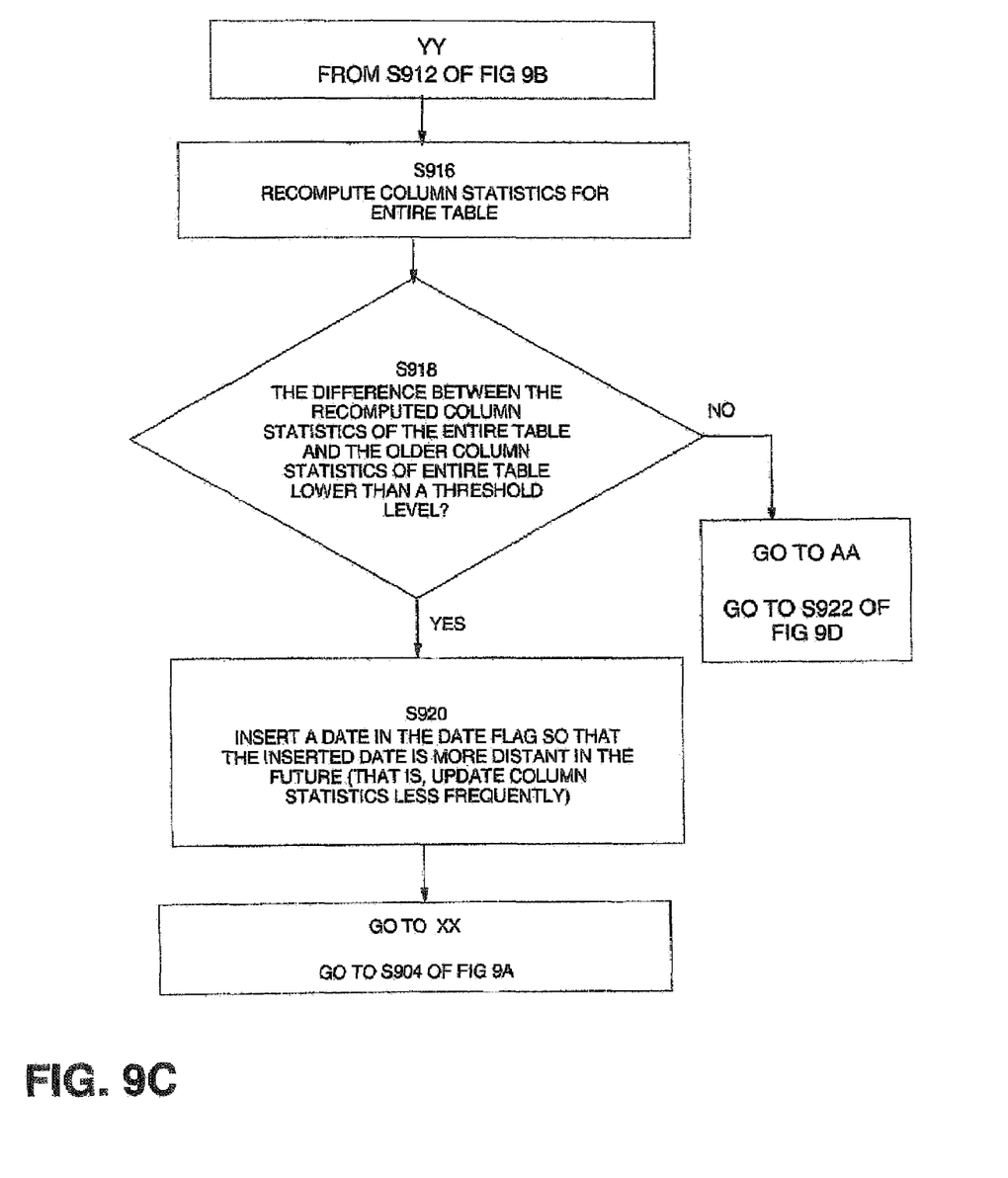

Operation S914 determines whether the difference between the sample histograms and the table histograms does not exceeding a preset threshold level. If the difference does not exceed the threshold level (that is, the sample does not warrant re-computation of the histograms) then a new value for the date flag is determined and then the SAS102 waits until that new date to start the procedure again (which means starting from operation S900).

Operation S916 includes re-computing the columns statistics for the entire table 126.

Operation S918 determines whether the difference histogram (the difference between the recomputed column histograms and the older table column histograms) are lower than another pre-set threshold level value. If the determination is NO, control may then be transferred over to operation S922. If the determination is YES, control may then be transferred over to operation S920.

Figure 9D:
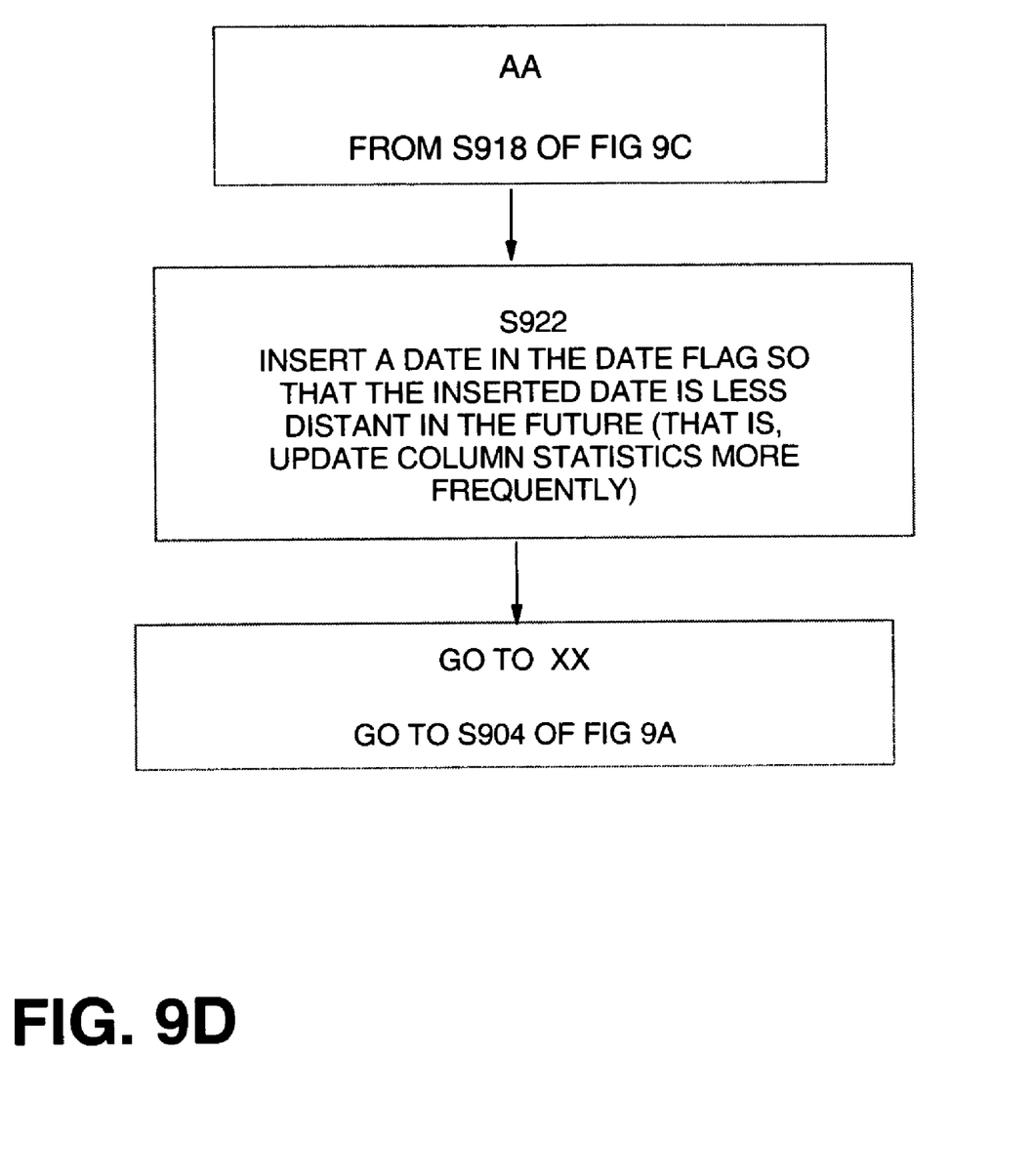

Operation S920 includes inserting a new date in a date flag (as described above for FIG. 8) so that the inserted date is more distant in the future. That is, the SAS 102 is to update columns statistics less frequently.

Operation S922 includes inserting a date in a date flag so that the inserted date is less distant in the future. That is, the SAS 102 is to update the column statistics more frequently. Control may then be transferred back over to operation S902.

Alternatively, the operations of the statistical analysis SAS102 may end at this point and begin again upon a received request from the user.

Figure 10:
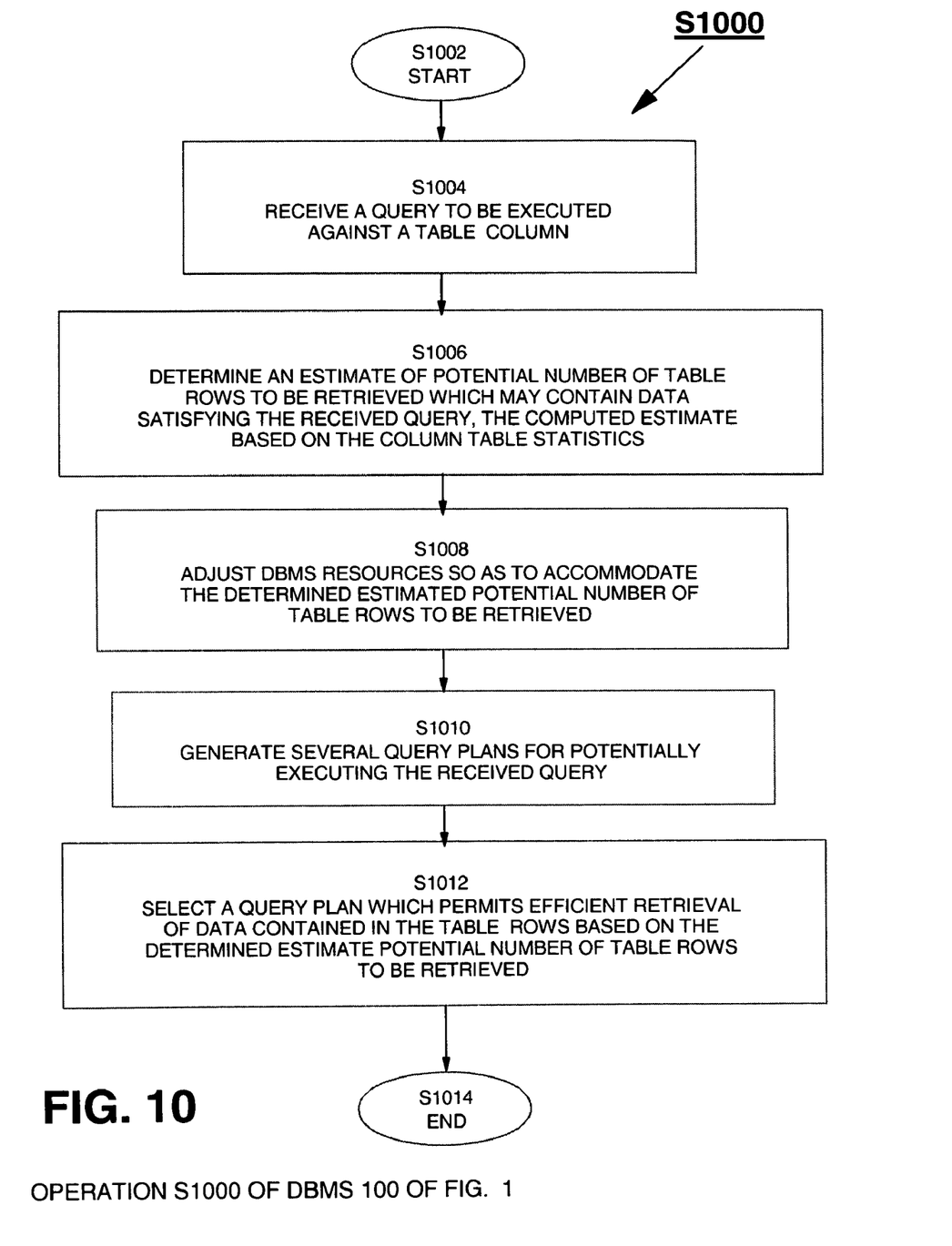
FIG. 10 shows operation of the DBMS of FIG. 1.

FIG. 10 shows operation S1000 of the DBMS 100 of FIG. 1.

Operation S1002 begins operation of the DBMS 100 upon receiving a user request or command directed to the DBMS 100.

Operation S1004 includes receiving a query to be executed against a table column.

Operation S1006 includes determining an estimate of a potential number of table rows to be received which may contain data satisfying the received query. The computed estimate is based on column table histograms (as known in the art).

Operation S1008 includes adjusting the resources of the DBMS 100 so as to accommodate the determined estimated potential number of table rows to be retrieved.

Operation S1010 includes generating several query plans for potentially executing the received query.

Operation S1012 includes selecting a query plan which permits efficient retrieval of the data contained in the table rows based on determined estimate potential number of table rows to be retrieved.

Operation S1014 includes ending the operation of DBMS 100 or alternatively until user indicates further requirements for DBMS 100.

It will be appreciated that the elements described above may be adapted for specific conditions or functions. The concepts of the present invention can be further extended to a variety of other applications that are clearly within the scope of this invention. Having thus described the present invention with respect to preferred embodiments as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

The invention claimed is:

1. For a database management system to be operatively coupled to a data processing system, the data processing system comprising memory for storing a data table, a method of determining frequency of updating a histogram of the data table, the method comprising:
    determining sampled histograms for sample portions of the data table over a period of time;
    computing a difference between at least two of the determined sampled histograms;
    determining a frequency with which to update the histogram of the data table depending on the amount of the computed difference; and
    storing the determined frequency in the memory to update the histogram of the data table,
    wherein the determined sampled histograms include histogram sections; the step of computing the computed difference comprises:
    adjusting the sections of one sampled histogram to line up with sections of another sampled histogram;
    subtracting each section of the another sampled histogram from a corresponding section of the one sampled histogram; and
    computing the sum of the subtracted sections,
    wherein the method further comprises dividing the computed sum by a length of the x-axis of at least one of the one sampled histogram and the another sampled histogram.

2. The method of claim 1 wherein the step of determining the frequency comprises comparing the computed difference against a pre-set threshold level value.

3. The method of claim 1 wherein the computed difference is a geometric aspect representing a difference between the at least two of the sampled histograms.

4. The method of claim 3 wherein the geometric aspect represents an area under a curve.

5. The method of claim 3, wherein the geometric aspect represents a perimeter length of a curve.

6. A database management system comprising a central processing unit and to be operatively coupled to a data processing system, the data processing system comprising memory for storing a data table, the database management system for determining frequency of updating a histogram of the data table, the database management system further comprising:
    means for determining sampled histograms for sample portions of the data table from time to time;
    means for computing a difference between at least two of the determined sampled histograms;
    means for determining a frequency with which to update the histogram of the data table depending on the amount of the computed difference; and
    means for storing the determined frequency in the memory to update the histogram of the data table,
    wherein the determined sampled histograms include histogram sections; the means for computing the computed difference comprises:
    means for adjusting the sections of one sampled histogram to line up with sections of another sampled histogram
    means for subtracting each section of the another sampled histogram from a corresponding section of the one sampled histogram; and
    means for computing the sum of the subtracted sections,
    wherein the database management system further comprises means for dividing the computed sum by a length of the x-axis of at least one of the one sampled histogram and the another sampled histogram.

7. The database management system of claim 6 wherein the means for determining the frequency comprises comparing the computed difference against a pre-set threshold level value.

8. The database management system of claim 6 wherein the computed difference is a geometric aspect representing a difference between the at least two of the sampled histograms.

9. The database management system of claim 8 wherein the geometric aspect represents an area under a curve.

10. The database management system of claim 8 wherein the geometric aspect represents a perimeter length of a curve.

* * * * *